US005712627A

United States Patent [19]

Watts

[11] Patent Number: 5,712,627

[45] Date of Patent: Jan. 27, 1998

[54] SECURITY SYSTEM

[75] Inventor: J. Rodney Watts, Kingsport, Tenn.

[73] Assignee: Eastman Chemical Company, Kingsport, Tenn.

[21] Appl. No.: 423,479

[22] Filed: Apr. 19, 1995

[51] Int. Cl.[6] .............................. G07D 7/00; G06F 7/04; G06K 5/00

[52] U.S. Cl. .............................. 340/825.34; 340/825.31; 235/380; 235/382

[58] Field of Search ......................... 340/825.34, 825.31; 235/382, 380

[56] References Cited

U.S. PATENT DOCUMENTS 3,569,619 3/1971 Simjian .
3,593,292 7/1971 Scott .
4,184,148 1/1980 Smagala-Romanoff .
4,288,780 9/1981 Theodoru et al. .................... 340/146.3
4,445,712 5/1984 Smagala-Romanoff .
4,528,442 7/1985 Endo .
4,529,870 7/1985 Chaum .
4,750,201 6/1988 Hodgson et al. ........................ 379/144
5,239,583 8/1993 Porrillo ..................................... 380/23
5,246,375 9/1993 Goede .
5,465,084 11/1995 Cottrell .............................. 340/825.31

*Primary Examiner*—Michael Horabik
*Assistant Examiner*—Anthony A. Asongwed
*Attorney, Agent, or Firm*—Charles R. Martin; Harry J. Gwinnell

[57] ABSTRACT

A security system is for determining whether a person has possession of an issued identification card. The system includes a plurality of identification cards. Each one of the issued cards has a plurality of addressable positions. Each one of the addressable positions having an indicium. Each one of a plurality of authorized persons is assigned a corresponding one of the identification cards. The indicium at one of the addressable positions on one of the assigned cards being different from the indicium at the same one of the addressable positions on another one of the assigned cards. In a preferred embodiment of the invention, the addressable positions are arranged in a matrix of rows and columns. The indicium at each of the addressable positions of one of the assigned cards is different from the indicium at each of the addressable positions of the other ones of the assigned cards. The method for determining whether a person seeking access is authorized to obtain the requested access includes the steps: (a) distributing each one of the identification cards to a corresponding one of a plurality of authorized users; (b) optionally assigning a different password to a corresponding one of the plurality of authorized persons; (c) requesting of a person seeking access to identify themselves, provide the indicium at a specified one of the addressable positions on the card assigned to the identified person. If the indicium matches that assigned to the person seeking access, access is granted; otherwise access is denied. A password may also be assigned to authorized persons.

5 Claims, 1 Drawing Sheet

SECURITY SYSTEM

BACKGROUND OF THE INVENTION

This invention relates generally to security systems and more particularly to systems which enable the identification of an individual for security purposes. Still more particularly, the invention relates to a device that assists in identifying an individual when visual contact is not possible or practical.

As is known in the art, some security systems use identification cards for determining whether a person desiring access to such things as a computer, long distance carrier, or building is, in fact, a person authorized to have such access. In one type of such security system, persons authorized to have access are given a so called "smart card". Such "smart card" typically contains a card identification number, a battery, a display window, a computing device, and a timing device. A corresponding central computer contains programming which generates the same information at the same time as the "smart card". That is, the two computing devices stay in synchronization with each other so that at any given point in time, the "smart card" will display exactly the same data as the central computer. The authorized person is typically also issued a password, or personal identification number (PIN) which is to be memorized by the person authorized to have possession of the identification card. When access is desired, the "smart card" holder conveys his/her card identification number, PIN number, and the data found in the "smart card" display window. If this information matches exactly the information in the central computer, access is granted; otherwise access is denied. The problem with "smart card" technology is that "smart cards" are relatively expensive, bulky and over time, tend to drift (i.e. the timing device gets out of sync with the timing device of the central computer). In other, less expensive, non-smart, security systems, the user is given a card with an identification number printed on the card. Such identification card may be a telephone calling card, for example. The person is also given a personal identification number. While such arrangement provides some form of protection, when the person in possession of such card is at a telephone, for example, and dials, i.e., punches, a number to be called followed by a fixed calling card number, followed by a fixed personal identification number, an unscrupulous observer of the caller is able to determine the calling card number and the personal identification thereby enabling unauthorized placement of phone calls, for example. In addition, telephone lines and computer lines can be "tapped", thus allowing an unscrupulous person to obtain the calling card number and the PIN number of the person placing the call. The fixed calling card number and PIN number are at even greater risk of being discovered when wireless devices (such as cellular phones) are used.

SUMMARY OF THE INVENTION

In accordance with the present invention a security system is provided for determining whether a person has possession of an issued identification card. The system includes a plurality of identification cards. Each one of the issued cards has a plurality of addressable positions. Each one of the addressable positions having an indicium. Each one of a plurality of authorized persons is assigned a corresponding one of the identification cards. The indicium at one of the addressable positions on one of the assigned cards is different from the indicium at the same one of the addressable positions on another one of the assigned cards.

In a preferred embodiment of the invention, the addressable positions are arranged in a matrix of rows and columns. The indicium at each of the addressable positions of one of the assigned cards is different from the indicium at each of the addressable positions of the other ones of the assigned cards.

The method for determining whether a person seeking access is authorized to obtain the requested access includes the steps: (a) distributing each one of the identification cards to a corresponding one of a plurality of authorized users; (b) requesting of a person seeking access to identify themselves, provide the indicium at a specified one of the addressable positions on the card assigned to the identified person. If the indicium matches that assigned to the identified person, access is granted; otherwise access is denied. Optionally, a different password may be assigned to a corresponding one of the plurality of authorized persons. In such case, the person seeking access may be asked for the password in addition to the indicium. Thus, while the security card may be effectively utilized without a password, an accompanying password is recommended. Adequate security dictates that two elements need to be present for proper authentification: 1) something the authorized person knows (i.e. their password) and 2) something the authorized user possesses (i.e. the security device). The password may be an integral part of an organization's (requester/caretaker) existing security or a password may be assigned at the time the security device is issued.

DESCRIPTION OF THE PREFERRED EMBODIMENT

Figure 1C:
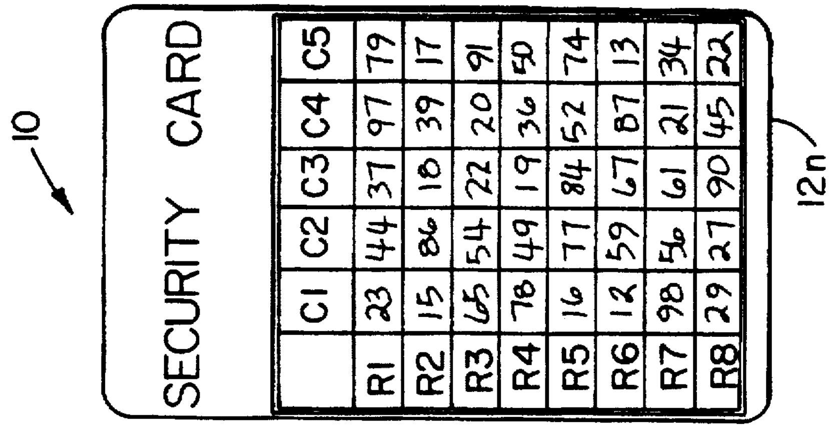
FIGS. 1*a*–1*c* show a plurality of identification cards used in the security system according to the invention.
Figure 1B:
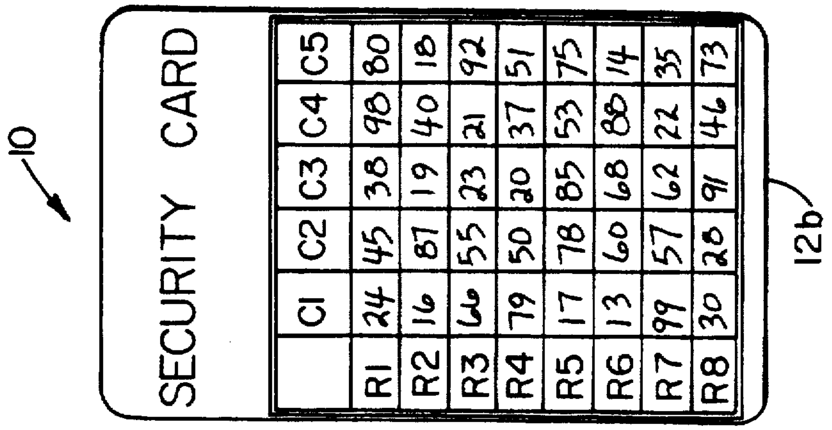
Figure 1A:
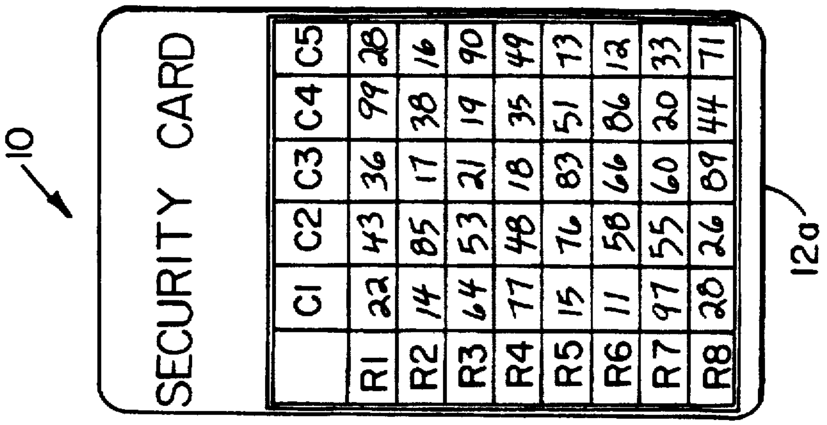

Referring now the FIGURE, a security system 10 for determining whether a person seeking access to a secured system, such as a computer, telephone long distance carrier, or building is authorized to obtain such access. The system 10 includes a plurality of identification, or Security cards **12*a*–12*n*. Each one of the cards 12*a*–12*n* has a plurality of addressable positions, here arranged in rows $R_1$–$R_m$ and columns $C_1$–$C_n$. In the example shown in FIG. 1, m=8 and n=5. Thus, the cards 12*a*–12*n* here have 40 addressable positions. Each one of the addressable positions has a row address $R_1$–$R_m$ and a column address $C_1$–$C_n$. Each one of the addressable positions $R_1,C_1$–$R_m,C_n$ has an indicium, here a two digit number. Each person allowed access is assigned a corresponding one of the identification cards 12*a*–12*n*. The proposed identification cards 12*a*–12*n* are printed cards with indicia randomly selected by a computer system. The authorized person may also be given, or have a preassigned, password, and an existing identification number, such as an employee number or a telephone calling card number to identify the person issued the identification card. The organization (requester/caretaker) issuing the cards will determine if: 1) no password is to be used, 2) a password is to be given to the authorized person to memorize at the time of issuance of one of the identification cards 12*a*–12*n*, and/or 3) integrate the identification cards 12*a*–12*n*** into the existing security system in order to provide an additional layer of security protection (i.e. person also has in their possession the issued security card).

Each one of the identification cards **12*a*–12*n* has different indicia in the addressable positions. The indicium at one of the addressable positions on one of the assigned cards is different from the indicium at the same one of the addressable positions on another one of the assigned cards. To put it another way, the two digit number at any row, column position on one of the identification cards 12***a*–12*n* is different from the two digit number at the same row, column position on all of the other cards 12*a*–12*n*. Thus, considering card 12*a*, 12*b* and 12*n*, the number at position $R_3,C_4$ on card 12*a* is 19 while on card 12*b* and 12*n* the numbers at the same position $R_3,C_4$ are 21 and 20, respectively, as shown. Thus, generally, each identification card 12*a*–12*n* has a unique pattern of indicia.

After having been issued one of the identification cards, a determination can be made as to whether a person requesting access is authorized. The system 10 makes such determination by two criterion: (1) Does the person seeking access know something they should know (i.e., the assigned password); and, (2) Does the person seeking access have something they should have (i.e., the unique identification card issued to that person) ? More particularly, the person requesting access is asked for an identification number, typically the person's employee number or calling card number, for example, to identify the person seeking access to the requestor/caretaker (which may be a computer system). If a person is authorized to have access, the first criterion is evaluated by requesting the identified person's preassigned, memorized password. If the password matches with the identified person's password, then the second criterion is evaluated. Thus, the person seeking access is next asked for the indicium at a specified, randomly chosen one of the, here 40 addressable positions (i.e, at one of the row, column addressable positions on the card) to determine whether the identified person has in their possession their assigned identification card.

For example, let if be assumed that person A is authorized to have access to the secured system, but another, unauthorized person X, has previous learned of A's identification number (i.e., employee number or bank account number). Let it also be assumed that person X previously overheard, or saw, person A punching in his/her password and as a result, now knows person A's password. Therefore, when person X seeks access, he/she is able to give the proper identification number and password for person A upon questioning by the requestor/caretaker. If person A has been assigned card 12*b* and retains possession of his/her assigned card, here card 12*b* for example, then person A will be in a position to give a proper response to the requestor in control of the access. Upon giving the requestor the proper two digit number, access is granted. However, if person X does not have possession of card 12*b* previously issued to person A, person X will not likely know the correct one of the here 40 indicium at the requested address. For example, if the requestor asks for the number at row $R_1$ and column $C_5$, person X will in high likelihood not be able to respond with the number 80 at the address $R_1,C_5$ for card 12*b*. Therefore, person X will not respond to the requested address properly and his/her access will be denied.

Other embodiments are within the spirit and scope of the appended claims. For example, while the addressable positions are here arranged in a matrix of rows and columns other arrangements may be used. Further, while the indicia are here two digit numbers, numbers of more, or less, digits may be used, or, alternatively, a combination of numbers, letters, and/or other symbols may be used. Still further, while preferably the indicium at any addressable position on one card is different from the indicium at the same addressable position on all the other cards, such condition is not required as long as there are a sufficiently large number of cards having different indicium at the same addressable position to achieve the desired degree of security.

What is claimed is:

1. A method for determining whether a person seeking access is authorized to obtain the requested access comprising the steps of (A) distributing each of a plurality of identification cards to a corresponding person of a plurality of persons, each one of the cards having a plurality of addressable positions, each one of the addressable positions having an indicium, each one of the plurality of identification cards being assigned to a corresponding one of the plurality of persons, the indicium at one of the addressable positions on one of the assigned cards being different from the indicium at the same one of the addressable positions on another of the assigned cards, (B) making a first request that a person seeking access identify themselves by providing the indicium at a first addressable position on the card assigned to that person, (C) allowing a first access to the person if the indicium at the first addressable position on the card assigned to that person matches that assigned to the person, (D) making a second request that the person identify themselves by providing the indicium at a second addressable position on the card assigned to that person, and (E) allowing a second access to the person if the indicium at the second addressable position on the card assigned to that person matches that assigned to the person.

2. The method of claim 1 wherein the addressable positions are arranged in a matrix of rows and columns and wherein the person seeking access is asked to identify the indicium at the position identified by one of the rows and one of the columns.

3. The method of claim 1 wherein the indicium at each of the addressable positions on one of the assigned cards is different from the indicium at each of the addressable positions on the other assigned cards.

4. The method of claim 1 further including the steps of (F) assigning a password to each person of the plurality of persons, and (G) requesting that the person seeking access provide the password.

5. A method for determining whether a person seeking access is authorized to obtain the requested access comprising the steps of (A) distributing each of a plurality of identification cards to a corresponding person of a plurality of persons, each one of the cards having a plurality of addressable positions arranged in a matrix of rows and columns, each one of the addressable positions having an indicium, each one of the plurality of identification cards being assigned to a corresponding one of the plurality of persons, the indicium at one of the addressable positions on one of the assigned cards being different from the indicium at each of the addressable positions on another of the assigned cards, (B) assigning a different password to each person of the plurality of persons, (C) making a first request that a person seeking access identify themselves by providing their password and the indicium at a first addressable position on the card assigned to that person, the first addressable position identified by one of the rows and one of the columns, (D) allowing a first access to the person if the password matches that assigned to the person and the indicium at the first addressable position on the card assigned to that person matches that assigned to the person, (E) making a second request that the person identify themselves by providing their password and the indicium at a second addressable position on the card assigned to that person, the second addressable position identified by one of the rows and one of the columns, and (F) allowing a second access to the person if the password matches that assigned to the person and the indicium at the second addressable position on the card assigned to that person matches that assigned to the person.

* * * * *